(12) United States Patent
Guy

(10) Patent No.: US 7,119,480 B2
(45) Date of Patent: Oct. 10, 2006

(54) VENTILATED REFLECTOR

(75) Inventor: James K Guy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 10/669,909

(22) Filed: Sep. 24, 2003

(65) Prior Publication Data

US 2005/0062384 A1   Mar. 24, 2005

(51) Int. Cl.
*H01J 5/16*    (2006.01)
*H01J 61/40*   (2006.01)
*H01K 1/26*    (2006.01)
*H01K 1/30*    (2006.01)

(52) U.S. Cl. ............... 313/113; 313/114; 313/116; 313/117

(58) Field of Classification Search ........ 313/114, 313/112, 113
See application file for complete search history.

(56) References Cited

U.S. PATENT DOCUMENTS

| | | | | |
|---|---|---|---|---|
| 1,436,308 A | * | 11/1922 | Evans ................... | 313/114 |
| 3,515,930 A | * | 6/1970 | Keimer et al. .......... | 313/316 |
| 3,703,635 A | * | 11/1972 | Burkarth ................ | 362/300 |
| 5,091,835 A | | 2/1992 | Malek et al. ........... | 362/294 |
| 5,561,338 A | | 10/1996 | Roberts et al. ......... | 313/46 |
| 5,594,831 A | * | 1/1997 | Oparin et al. .......... | 392/421 |
| 6,027,237 A | | 2/2000 | Riser et al. ............. | 362/580 |
| 6,031,320 A | | 2/2000 | Kamarehi et al. ...... | 315/112 |
| 6,034,467 A | | 3/2000 | Roberts ................... | 313/46 |
| 6,176,624 B1 | | 1/2001 | Hatjasålo et al. ........ | 385/88 |
| 6,179,446 B1 | | 1/2001 | Sarmadi .................. | 362/264 |

\* cited by examiner

*Primary Examiner*—Mariceli Santiago
*Assistant Examiner*—Elizabeth Rielley
(74) *Attorney, Agent, or Firm*—Harness Dickey & Pierce P.L.C.

(57) ABSTRACT

A reflector assembly includes at least one reflector body having an inner cavity including a first inner surface conformable along a first geometric curve, and a second inner surface conformable along a second geometric curve. An outer surface is conformable about the first geometric curve. A plurality of through apertures are spaced about the reflector body, each formed between the outer surface and a transition region between the first inner surface and the second inner surface. A coolant flow source directs a coolant toward the reflector body. A first portion of the coolant contacts the outer surface, and a second portion of the coolant enters the inner cavity through the apertures. Providing apertures at or adjacent to the change in reflector body wall thickness allows a positive flow of cooling medium around and into the reflector body, while positioning an arc lamp outside of a cooling medium direct impingement path.

31 Claims, 5 Drawing Sheets

VENTILATED REFLECTOR

FIELD OF THE INVENTION

The present invention relates to a reflector assembly used to focus or direct light and more specifically to a device and method for reflecting light while providing for reflector cooling of a reflector assembly.

BACKGROUND OF THE INVENTION

Illuminators are used in many applications including for fiber optic illumination, commercial illumination including street lamps etc., and in public consumption such as illumination for stadiums. Illuminators locate the source of light remote from the area to be illuminated. Illuminators generally provide a reflector body which contains an arc lamp. The light generated from the arc lamp is reflected from the internal geometry of the reflector body to the general area where light is required.

One of the problems with arc lamp illuminators is the control of the source heat load. Passive methods for controlling the thermal heat load include radiative fins installed on the outer body of the reflector body. Active control of arc lamp heat load includes fan or cooling sources located local to or remote from the reflector body. Fan systems generate an air flow, which is often transversely directed over the body of the reflector body. It is undesirable to provide air or cooling flow directly on or directly impinging the body of the arc lamp itself because of the detrimental impact on the continuum state that the arc lamp is intended to operate within. When the arc lamp drops out of its continuum state, output line spectra is altered from the desirable spectra of the arc lamp. This is a particular problem for applications of fiber optic light illuminators.

Another problem of existing reflector bodies is that the internal geometry of the reflector body is required to be maintained as close as possible to the desired geometric shape such as an ellipse. Cooling features added to or modifying the shape of the ellipse or other geometric shape of the reflector body detrimentally reflect light or absorb light generated by the arc lamp thereby decreasing the efficiency of the illuminator. One of the most significant impacts due to inefficient cooling is a net reduction in the overall operating life of the arc lamp (bulb) itself. When cooling medium is transversely blown across the open face of the reflector assembly, eddy currents can be trapped within the reflector body and result in local hot spot areas which also lead to decreased arc lamp life.

SUMMARY OF THE INVENTION

According to a preferred embodiment of the present invention, a reflector body comprises a mount end. A curved body portion is integrally joined to the mount end. The curved body portion includes: (i) a first inner surface conformable about a first geometric curve; (ii) a second inner surface conformable about a second geometric curve and (iii) an outer surface conformable about the first geometric curve. An open end operably discharges light rays incident on one of the first and second inner surfaces.

According to another aspect of the present invention, a reflector assembly comprises at least one reflector body each including an outer surface; and (ii) an inner cavity. The inner cavity includes: (a) a first inner surface conformable about a first geometric curve; and (b) a second inner surface conformable about a second geometric curve. A plurality of through apertures are spaced about each reflector body, each aperture formable between the outer surface and the first inner surface. A coolant flow source is operable to direct a coolant toward the at least one reflector body. A first portion of the coolant axially contacts the outer surface, and a second portion of the coolant is directable by the apertures into the inner cavity.

According to yet another aspect of the invention, a method to construct a reflector assembly comprises: forming an inner cavity of a reflector body about concentric geometric curves; reducing a reflector body wall thickness in an area local to a light discharge end of the reflector body; creating a plurality of apertures through the reflector body outside of the area having reduced wall thickness; aligning a coolant source with the apertures; and positioning an arc lamp within the reflector body away from a direct impingement path between a coolant entering the apertures and the arc lamp.

Advantages of a reflector assembly of the present invention include provision of a reflector body formed about concentric geometric curves, and the definition of a wall thickness change in an area between the geometric curves. Providing apertures at or adjacent to the change in reflector body wall thickness allows a positive flow of cooling medium into the reflector body, while allowing an arc lamp location outside of a direct impingement path of the cooling medium. Also, by locating the apertures at the change in reflector body wall thickness, light rays from the arc lamp cannot directly enter the apertures, and thereby lead to efficiency losses of the reflector assembly. A longer arc lamp life can result from the cooling paths created by the apertures of the present invention.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
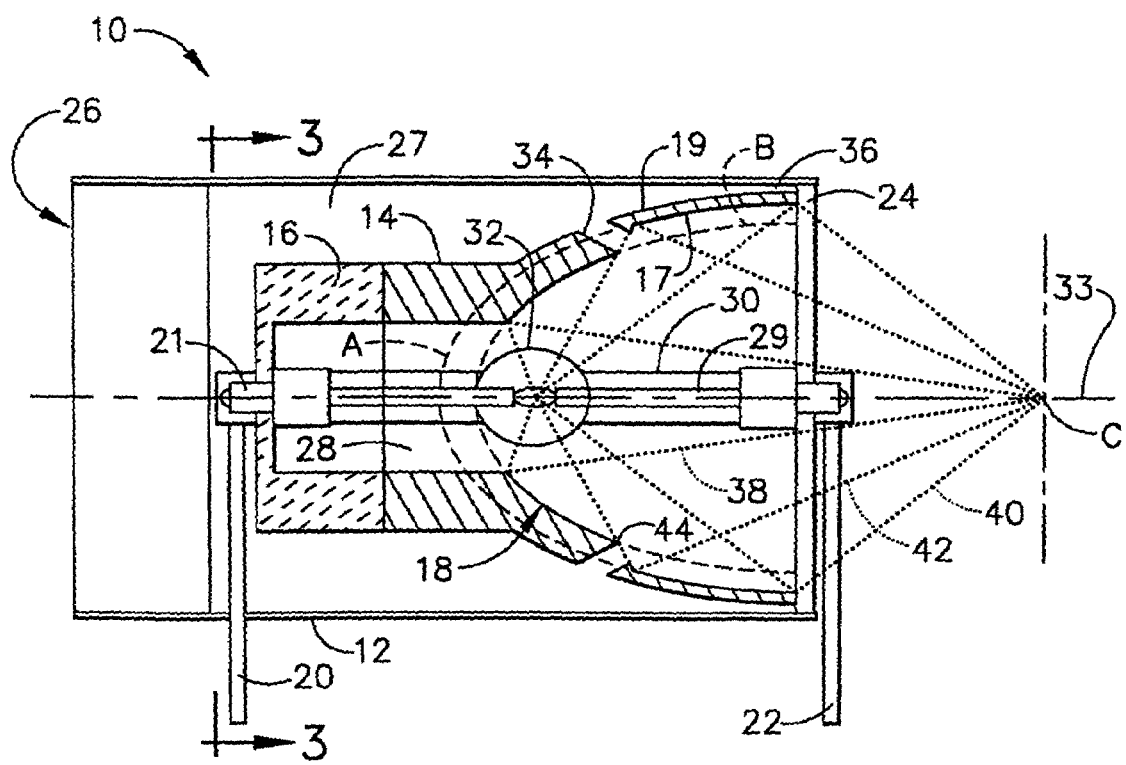
FIG. 1 is a partial cross sectional elevational view of a ventilated reflector assembly according to a preferred embodiment of the present invention.

According to a preferred embodiment of the present invention, and referring to FIG. 1, a reflector assembly 10 includes a plenum 12, a reflector body 14, and a non-conductive mount 16. Non-conductive mount 16 is directly joined to reflector body 14 forming a closed end of reflector body 14. Non-conductive mount 16 is generally formed of a non-electrically conductive material including ceramic materials. Plenum 12 surrounds the combination of reflector body 14 and non-conductive mount 16. Plenum 12 is preferably formed of a metallic material, including aluminum or steel. Other materials including polymeric materials or composite materials can also be used to form plenum 12. Reflector body 14 is preferably formed of a metallic material including aluminum having polished and/or coated inner surfaces as generally known in the art. Reflector body 14 is substantially formed about a pair of concentric geometric curves. In the exemplary embodiment shown in FIG. 1, a first inner surface 17 of reflector body 14 is formed about a first ellipse "A". A second inner surface 18 of reflector body 14 is formed about a second ellipse "B". Second inner surface 18 transitions outwardly to first inner surface 17. An outer surface 19 is also substantially conformable about first ellipse "A", including a wall thickness of reflector body 14 that varies about first inner surface 17 and second inner surface 18. Outer surface 19 intersects with non-conductive mount 16.

A first lead wire 20 is connectable through a bulb end connection 21 to non-conductive mount 16. A second lead wire 22 is connectable via a bulb mount 24 to reflector body 14. A coolant flow source 26 is connectable to plenum 12 adjacent to non-conductive mount 16. A purpose for coolant flow source 26 is to direct a coolant 27, from outside of plenum 12 to an interior portion of plenum 12. Reflector body 14 also includes an inner cavity 28 having a pair of electrodes 29 exposed within a pair of legs 30. Each of the legs 30 connect to an arc lamp 32. Electric current flows via first lead wire 20 and second lead wire 22 through electrodes 29 to arc lamp 32. Electrodes 29, legs 30 and arc lamp 32 are generally arranged coaxial with a longitudinal centerline 33 of reflector body 14.

A plurality of apertures 34 are generally formed at a transition area between first inner surface 17 and second inner surface 18 of reflector body 14. A purpose for apertures 34 is to direct a portion of coolant 27 flowing within plenum 12 toward the inner cavity 28 of reflector body 14.

In the embodiment shown, the use of ellipses to form reflector body 14 provides a focal point "C" for light rays generated by arc lamp 32 and reflected by first inner surface 17 or second inner surface 18. Reflected light rays exit a generally open end 36 of reflector body 14 through apertures (not shown) formed in bulb mount 24, or, through bulb mount 24 when bulb mount 24 is formed of a transparent material. Exemplary ray paths are shown in FIG. 1. A narrow ray path 38 is formed between arc lamp 32, second inner surface 18 and focal point C. A wide ray path 40 is formed between arc lamp 32, a distal end of second inner surface 18 and focal point "C". A near-aperture ray path 42 is formed between arc lamp 32, a transition region between first inner surface 17 and second inner surface 18, and focal point "C". Arc lamp generated light is prevented from directly entering apertures 34 by a maximum aperture junction point 44.

Aperture junction point 44 is formed at an interior distal end of each of the apertures 34. By positioning each of the apertures 34 at or in a transition region between first inner surface 17 and second inner surface 18, substantially all the light generated by arc lamp 32 directly striking either first inner surface 17 or second inner surface 18 is reflected out of reflector body 14.

Figure 2:
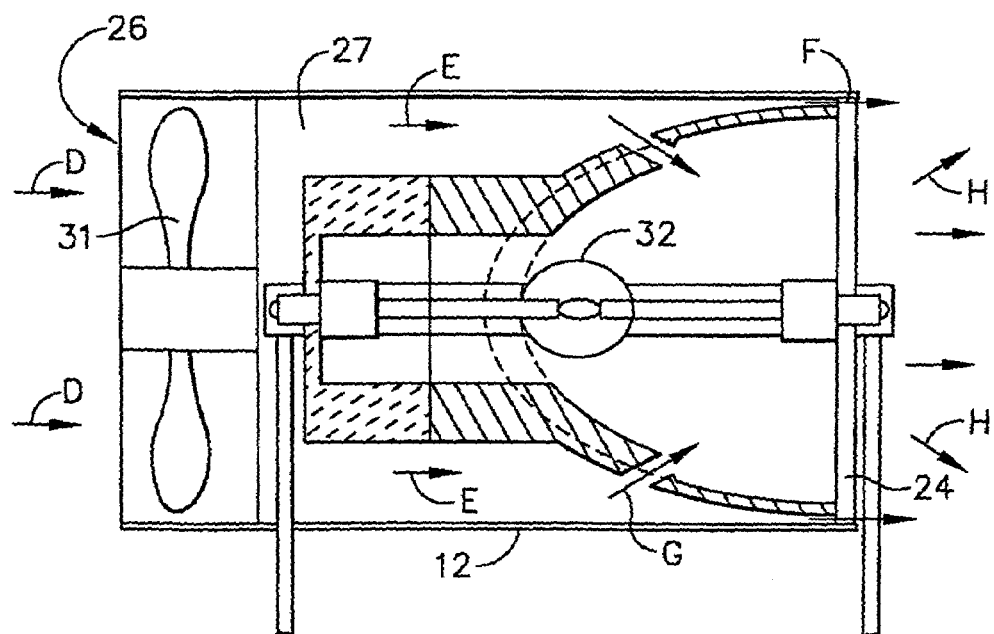
FIG. 2 is a partial cross sectional elevational view similar to FIG. 1 identifying the flow paths of a cooling medium from an external source through a ventilated reflector of the present invention.

As best seen in FIG. 2, coolant 27 is directed by coolant flow source 26 from an inlet flow path "D" to an axial flow path "E" within plenum 12. From axial flow path "E", coolant 27 splits and flows in part through clearance flow paths "F" and via aperture cooling flow paths "G". Coolant flowing via clearance flow paths "F" cools first inner surface 17 of reflector body 14. Coolant flowing in aperture cooling flow paths "G" cools items within inner cavity 28 and exits reflector body 14 via exit flow paths "H". Exit flow paths "H" are provided using apertures (not shown) formed in bulb mount 24. Aperture cooling flow paths "G" do not result in direct impingent cooling flow onto arc lamp 32 because apertures 34 are formed in reflector body 14 downstream (i.e., positioned to the right as viewed in FIG. 2) of arc lamp 32. Each of apertures 34 are formed either normal to outer surface 19 or at an acute angle between outer surface 19 and longitudinal centerline 33 such that cooling flow cannot directly impinge arc lamp 32. A fan 31 is shown positioned within coolant flow source 26 for reference. Fan 31 can be located adjacent to or remotely located from plenum 12.

Figure 3:
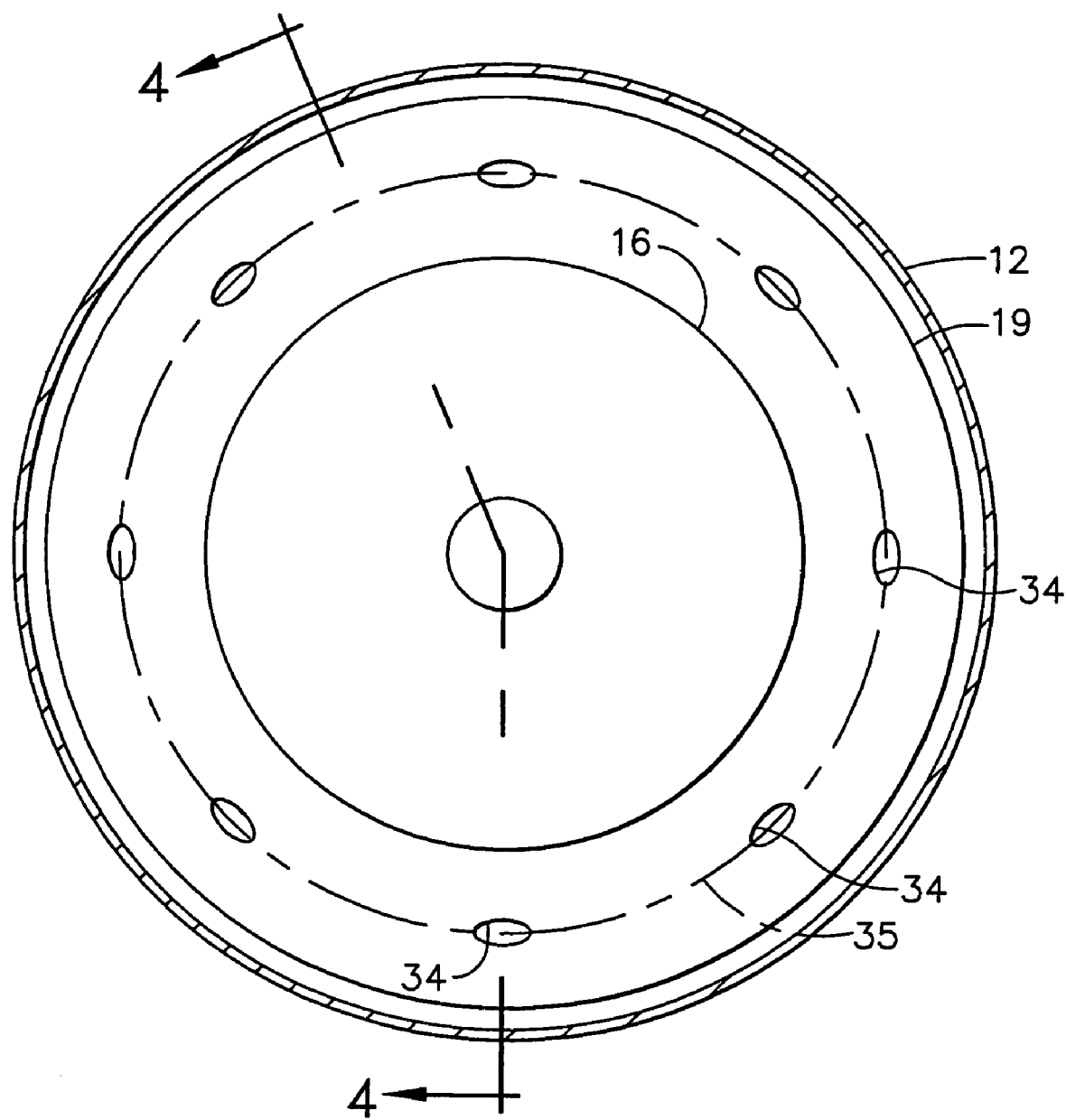
FIG. 3 is a cross sectional end elevation view taken at section 3—3 of FIG. 1.

As best seen in FIG. 3, each aperture 34 is generally formed about a common aperture arc 35. Common aperture arc 35 is superimposed about reflector body 14 on outer surface 19. An exemplary quantity of eight (8) apertures 34 is shown. Both the quantity and size of apertures 34 can vary depending upon several variables. These variables include: the desired output of arc lamp 32; the material(s) of reflector body 14; the overall size and curvature of reflector body 14; the volume and flow rate of coolant; the ambient temperature surrounding reflector body 14; the temperature of coolant 27; and other variables. Apertures 34 can also be provided on more than one aperture arc, and/or in non-regular intervals (not shown for clarity).

Figure 4:
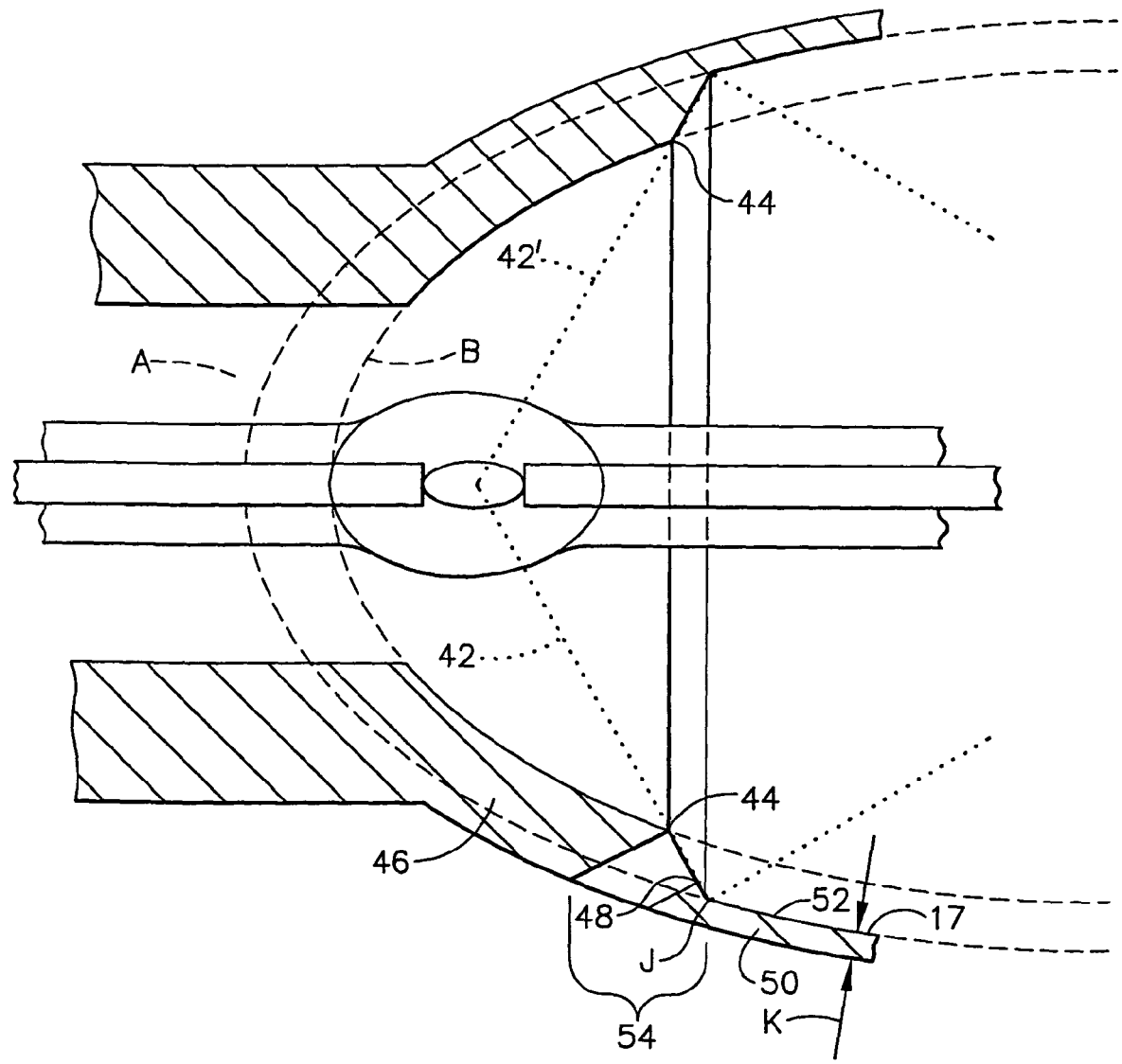
FIG. 4 is a cross sectional view taken at section 4—4 of FIG. 3.

As shown in FIG. 4, an exemplary configuration for an aperture 34 is provided. In addition, the geometry of reflector body 14 in a transition region between first inner surface 17 and second inner surface 18 is provided in an area lacking an aperture 34. By locating apertures 34 adjacent a reflector major thickness 46 formed between outer surface 19 and second ellipse "B", near-aperture ray path 42 results, preventing light from entering aperture 34. Light traveling along near aperture ray path 42 grazes past maximum aperture junction point 44 and strikes second inner surface 18, while clearing a minimum aperture junction point 48. As evident in FIG. 4, a reduced wall thickness section 50 results between first inner surface 17 and outer surface 19. A reflective surface 52 is formed on first inner surface 17 such that light following near aperture ray path 42 strikes reflective surface 52 at an aperture adjacent location "J" and is reflected out of reflector body 14. A reduced wall thickness "K" is substantially continuous between aperture adjacent location "J" and bulb mount 24.

In areas where apertures 34 are not provided, such as depicted in the upper section of FIG. 4, a near-aperture ray path 42' similarly grazes past maximum aperture junction point 44 to reflect off reflective surface 52. By forming the transition area between first ellipse "A" and second ellipse "B" of the present invention, maximum aperture junction point 44 prevents direct light ray entrance into any aperture 34. Light rays from arc lamp 32 strike either first inner surface 17 or second inner surface 18 and do not directly impinge any surface formed in a transition region 54 between second inner surface 18 and aperture adjacent location "J" on first inner surface 17. Transition region 54 is formed circumferentially about reflector body 14.

Figure 5:
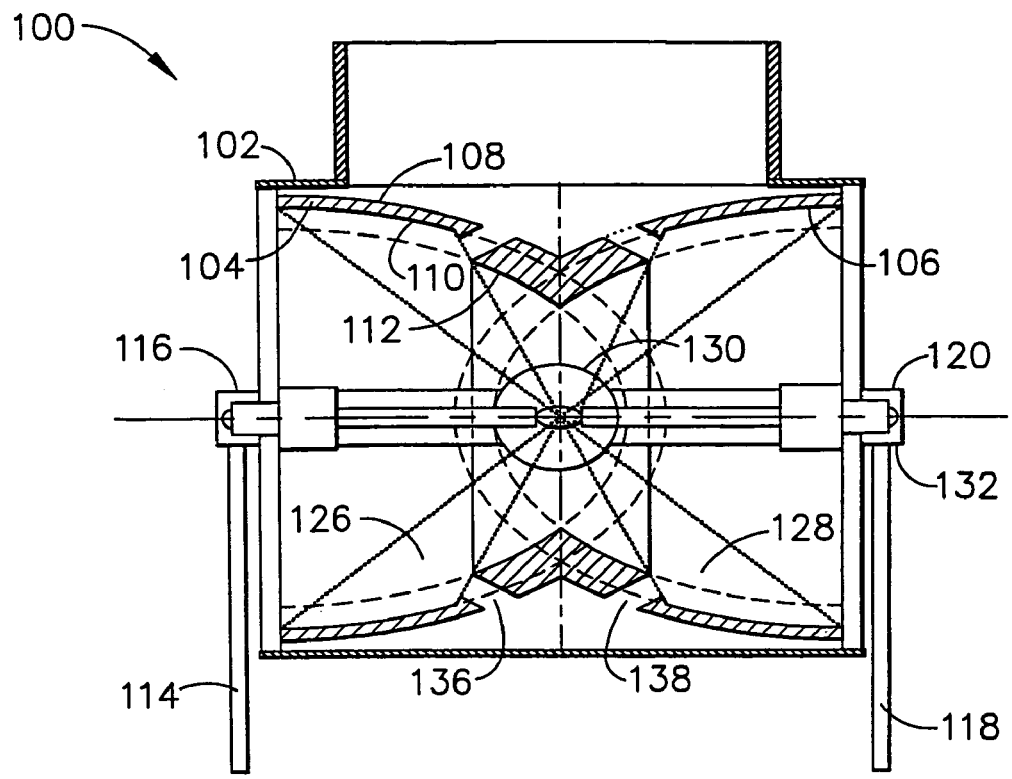
FIG. 5 is a partial cross sectional elevational view of another embodiment for a ventilated reflector of the present invention.
Figure 6:
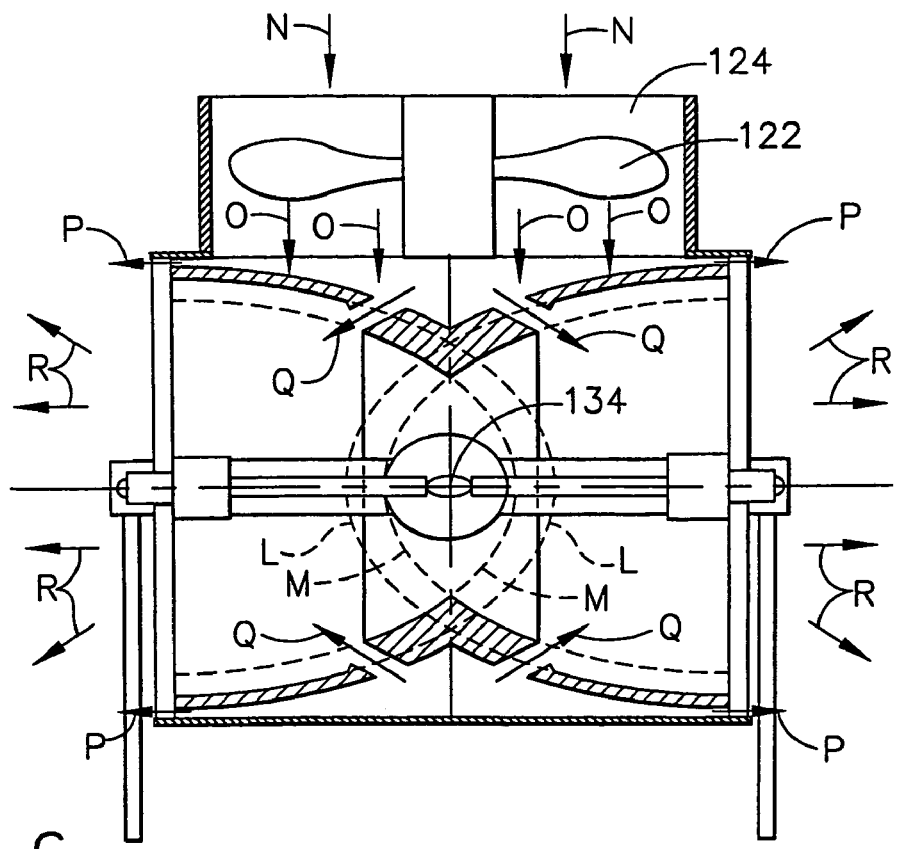
FIG. 6 is a partial cross section elevational view similar to FIG. 5 showing a plurality of coolant medium flow paths from an external cooling source through a two part ventilated reflector according to a second preferred embodiment of the present invention.

Referring now to both FIGS. 5 and 6, another preferred embodiment of the present invention provides a dual reflector assembly 100. Dual reflector assembly 100 includes a plenum 102 housing a first reflector body 104 and a second reflector body 106. Similar to reflector assembly 10, each of first reflector body 104 and second reflector body 106 include an outer surface 108, a first inner surface 110, and a second inner surface 112 respectively. A first lead wire 114 is connectible at a first bulb mount 116. A second lead wire 118 is connectible at a second bulb mount 120. In this embodiment, coolant flow to dual reflector assembly 100 is provided transverse to plenum 102. A coolant flow fan 122 directs a volume of coolant 124 from an inlet flow path "N" to a transverse flow path "O" within plenum 102. Within plenum 102, coolant 124 flows in the transverse flow path "O" until it splits between both first reflector body 104 and second reflector body 106 into both coolant flow paths "P" and aperture cooling paths "Q". Coolant 124 exits from opposed ends of dual reflector assembly 100 in discharge flow paths "R".

First reflector body 104 includes a first inner cavity 126 and second reflector body 106 includes a second inner cavity 128. A single arc lamp 130 is centrally positioned along a longitudinal axis 132. Arc lamp 130 is centrally positioned at a junction area 134 formed between first reflector body 104 and second body reflector 106, respectively. First reflector body 104 and second reflector body 106 are each formed by common, overlapping first ellipses "L" and second ellipses "M". First ellipses "L" and second ellipses "M" are similar to first ellipse "A" and second ellipse "B", respectively, shown in FIG. 1.

First reflector body 104 includes a plurality of apertures 136. Second reflector body 106 includes a plurality of apertures 138. The size, orientation, and location of apertures 136 and 138 are similar to those for apertures 34 of reflector assembly 10, therefore apertures 136 and 138 will not be further described herein. Similarly, first reflector body 104 and second reflector body 106 include wall geometry similar to reflector assembly 10, therefore, these features will not be further discussed herein.

Operationally, light generated by arc lamp 130 reflects along similar ray paths out of dual reflector assembly 100 and in a similar manner as described for reflector assembly 10. The advantage of dual reflector assembly 100 is to provide dual illumination paths from a single arc lamp. Also, dual reflector assembly 100 eliminates the non-conductive mount similar to non-conductive mount 16 of reflector assembly 10. This helps reduce the weight of dual reflector assembly 100 and its manufacturing complexity. It is noted that coolant flow fan 122 can be replaced by a circumferentially mounted coolant housing adapted to deliver coolant circumferentially about plenum 102. Dual reflector assembly 100 is therefore not limited to a single orientation of coolant flow fan 122 or to a single inlet point of coolant into plenum 102.

Figure 7:
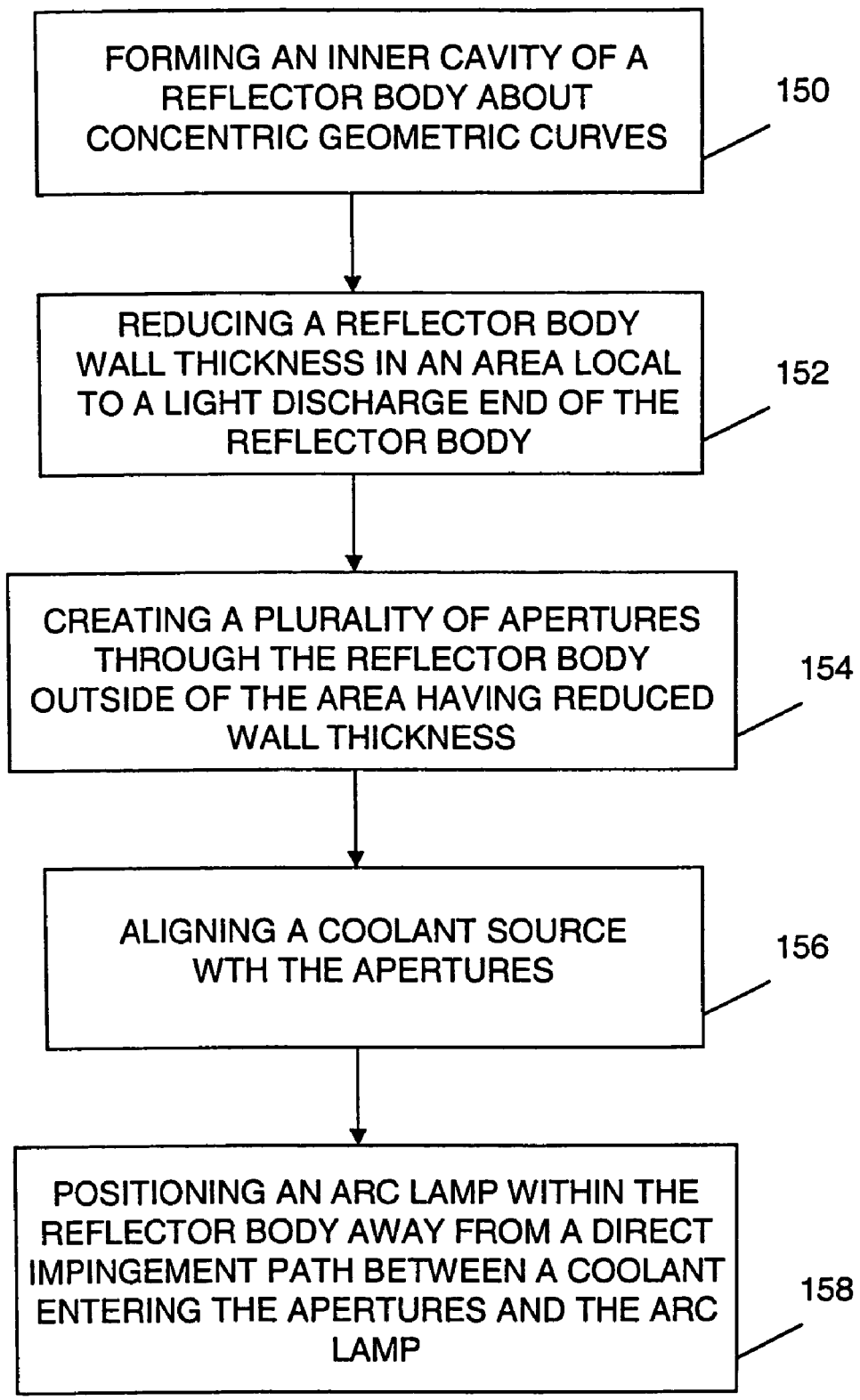
FIG. 7 is a flow chart identifying the steps to construct a ventilated reflector of the present invention.

Referring to FIG. 7, the steps to construct a ventilated reflector of the present invention are provided. In a step 150, an inner cavity of a reflector body is formed about concentric geometric curves. In a step 152, a reflector body wall thickness is reduced in an area local to a discharge end of the reflector body. At step 154, a plurality of apertures are created through the reflector body outside of the area having reduced wall thickness. In a step 156, a coolant source is aligned with the apertures. Finally, in a step 158, an arc lamp is positioned within the reflector body away from a direct impingement path between a coolant entering the apertures and the arc lamp.

Ventilated reflectors according to the present invention offer several advantages. By forming the inner cavity of a reflector body of the present invention using concentric geometric curves, a wall thickness of the reflector body can be varied in a transition region. Apertures provided adjacent to or in the transition region provide coolant flow entrances into the reflector body which do not directly impinge on an arc lamp positioned within the reflector body. Further, providing the transition areas between the geometric curves of the present invention prevents light rays from entering apertures formed through the reflector body. The source of coolant flow can advantageously be arranged in the present invention to provide coolant flow over an external surface of the reflector body as well as providing directed coolant flow to an internal cavity of the reflector body. Dual reflector assemblies of the present invention offer the advantages noted above for coolant flow and light ray reflection, as well as a simplified design for a ventilated reflector providing a dual output of light.

Ventilated reflector assemblies of the present invention are generally described herein as ellipsoidal in shape, however, other geometric curve patterns can be used including parabolic curves. Similar to the elliptical curve bodies, a first inner wall is created along a first parabolic curve and a second inner wall is created along a second parabolic curve. An outer surface is conformable to the first parabolic curve. This permits ventilated reflectors of the present invention to either focus light to a focal point, or to diffuse light in applications where focused light is not required. Ventilated reflectors of the present invention are particularly useful in fiber optic applications where improved arc lamp life and reduced spectral light variation are desirable. The improved arc lamp life provided by a ventilated reflector of the present invention is also advantageously applied in locations where arc lamps are difficult to access for replacement.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A reflector body, comprising:
   a homogenous single piece curved body portion, including:
   (i) a first inner surface conformable about a first geometric curve;
   (ii) a second inner surface conformable about a second geometric curve, the second geometric curve being smaller than the first geometric curve; and
   (iii) a substantially planar transition region joining the first and second geometric curves, the transition region defining a junction point; and
   a light discharge end of the body portion opening outwardly from the first geometric curve operable to discharge light rays incident on each of the first and second inner surfaces, the junction point preventing the light rays from directly striking the transition region when a source of the light rays is positioned proximate an opposite end of the curved body portion.

2. The reflector of claim 1, comprising an outer surface conformable about the first geometric curve.

3. The reflector of claim 2, comprising:
a first wall thickness between the outer surface and the first inner surface; and
a second wall thickness between the outer surface and the second inner surface;
wherein the second wall thickness is greater than the first wall thickness.

4. The reflector of claim 2, comprising:
a plurality of through apertures spaced about the curved body portion;
wherein each aperture is formable between the outer surface and the transition area, and positioned only within the transition area.

5. The reflector of claim 4, wherein each aperture is oriented normal to the outer surface.

6. The reflector of claim 4, wherein each aperture is oriented at an acute angle to the outer surface, the acute angle measurable from a horizontal axis of the reflector.

7. The reflector of claim 1, comprising:
the first geometric curve being configurable as a first ellipse; and
the second geometric curve being configurable as a second ellipse, the second ellipse concentrically positionable within the first ellipse.

8. The reflector of claim 1, comprising:
the first geometric curve being configurable as a first parabola; and
the second geometric curve being configurable as a second parabola, the second parabola concentrically positionable within the first parabola.

9. The reflector of claim 1, wherein each of the first and second inner surfaces comprise a reflective surface.

10. The reflector of claim 1, comprising:
a non-conductive material mount end;
wherein the curved body portion is integrally joined to the mount end.

11. A reflector assembly, comprising:
a homogenous single piece body including:
(i) an inner cavity including:
(a) a first inner surface conformable along a first geometric curve;
(b) a second inner surface conformable along a second geometric curve; and
(ii) an outer surface conformable about the first geometric curve; and
(iii) a substantially planar transition region joining the first and second geometric curves, the transition region defining a junction point;
a plurality of through apertures spaced about the reflector body, each aperture formable between the outer surface and the transition region between the first inner surface and the second inner surface; and
a coolant flow source operably directing a coolant toward the at least one reflector body;
wherein a first portion of the coolant contacts the outer surface, and a second portion of the coolant is directable by the apertures into the inner cavity.

12. The assembly of claim 11, comprising a plenum housing circumferentially surrounding at least the reflector body, the plenum housing operably directing the first portion of the coolant about the outer surface.

13. The assembly of claim 12, wherein the coolant flow source is alignable with a reflector body longitudinal centerline, the coolant flow source initially operably directing the coolant within the plenum housing and substantially parallel to the longitudinal centerline.

14. The assembly of claim 12, comprising:
a joined pair of reflector bodies having oppositely facing light discharge ends; and
the coolant flow source being alignable perpendicular to a common longitudinal centerline of the pair of reflector bodies, the coolant flow source operably directing the coolant within the plenum housing and initially substantially perpendicular to the common longitudinal centerline.

15. The assembly of claim 12, wherein the coolant flow source comprises a fan connectably mountable to the plenum housing.

16. The assembly of claim 11, wherein the reflector body comprises:
a first end having an electrically nonconductive support; and
a second open end.

17. The assembly of claim 16, comprising an arc lamp positionable within the inner cavity.

18. The assembly of claim 17, comprising:
a first lead wire electrically connectable to the arc lamp through the nonconductive support; and
a second lead wire electrically connectable to the arc lamp through the open end of the reflector body.

19. The assembly of claim 18, comprising:
a bulb mount connectably disposed across the open end of the reflector assembly and operably supporting the second lead wire; and
a plurality of coolant flow discharge ports formable in the bulb mount.

20. The assembly of claim 17, wherein the arc lamp is axially positionable adjacent the nonconductive support such that the coolant entering the apertures is directably discharged away from a direct impingent path with the arc lamp.

21. The assembly of claim 17, wherein the junction point comprises an internal edge of the second inner surface adjacent to each aperture, wherein any one of a plurality of light rays generated by the arc lamp strikes one of the internal edge and the first inner surface but is precluded by the internal edge from entering any one of the apertures.

22. The assembly of claim 11, wherein the coolant comprises a gas.

23. The assembly of claim 22, wherein the gas comprises air.

24. A method to construct a reflector assembly, comprising:
forming an inner cavity of a homogenous reflector body about concentric geometric curves;
reducing a reflector body wall thickness in an area local to a light discharge end of the reflector body;
joining the geometric curves by a substantially planar transition region defining a junction point;
creating a plurality of apertures through the transition region;
aligning a coolant source with the apertures; and
positioning an arc lamp within the reflector body away from a direct impingement path between a coolant entering the apertures and the arc lamp.

25. The method of claim 24, comprising positioning the plurality of apertures such that a plurality of light rays from the arc lamp completely reflect out of the light discharge end and are precluded by the junction point from directly entering the apertures.

26. The method of claim 24, comprising positioning the plurality of apertures on a common arc transposed about the outer wall.

27. The method of claim 24, comprising:
forming a first inner wall along a first ellipse; and
creating a second inner wall about a second ellipse, the second ellipse locatable concentrically within the first ellipse.

28. The method of claim 24, comprising
forming a first inner wall about a first parabola; and
creating a second inner wall about a second parabola, the second parabola locatable concentrically within the first parabola.

29. The method of claim 24, comprising positioning the arc lamp along a longitudinal centerline of the reflector body.

30. The method of claim 24, comprising joining a pair of reflector bodies along a common longitudinal centerline.

31. The method of claim 24, comprising:
enclosing the reflector body within a plenum housing; and
connecting the coolant source to the plenum housing.

* * * * *